(12) United States Patent
Arora et al.

(10) Patent No.: US 10,242,955 B2
(45) Date of Patent: Mar. 26, 2019

(54) ACTIVE TAMPER DETECTION CIRCUIT WITH BYPASS DETECTION AND METHOD THEREFOR

(71) Applicant: FREESCALE SEMICONDUCTOR, INC., Austin, TX (US)

(72) Inventors: Mohit Arora, Austin, TX (US); Kumar Abhishek, Austin, TX (US); Prashant Bhargava, Austin, TX (US); Rakesh Pandey, Austin, TX (US)

(73) Assignee: NXP USA, Inc., Austin, TX (US)

( * ) Notice: Subject to any disclaimer, the term of this patent is extended or adjusted under 35 U.S.C. 154(b) by 242 days.

(21) Appl. No.: 15/250,644

(22) Filed: Aug. 29, 2016

(65) Prior Publication Data

US 2018/0061780 A1 Mar. 1, 2018

(51) Int. Cl.
*H01L 23/00* (2006.01)
*G01R 31/02* (2006.01)
(Continued)

(52) U.S. Cl.
CPC .......... *H01L 23/576* (2013.01); *G01R 31/026* (2013.01); *G06F 21/87* (2013.01);
(Continued)

(58) Field of Classification Search
CPC .. H01L 23/576; G01R 31/026; H03K 19/003; H05K 1/0275
See application file for complete search history.

(56) References Cited

U.S. PATENT DOCUMENTS 4,603,305 A * 7/1986 McCune ................ H03B 23/00
331/117 R
4,647,871 A 3/1987 Turner, Jr.
(Continued)

OTHER PUBLICATIONS

Furth, Paul M. et al, "On the Design of Low-Power CMOS Comparators with Programmable Hysteresis", 53rd IEEE International Midwest Symposium on Circuits and Systems; DOI: 10.1109/MWSCAS.2010.5548836; 4 pages; Aug. 1-4, 2010.
(Continued)

*Primary Examiner* — Huy Q Phan
*Assistant Examiner* — Zannatul Ferdous
(74) *Attorney, Agent, or Firm* — Daniel D. Hill

(57) ABSTRACT

An active tamper detection circuit with bypass detection is provided. A bypass detection circuit is coupled to an active mesh loop. The bypass detector includes a voltage comparator with a variable hysteresis control circuit and a calibration engine. The bypass detector detects a change in impedance in the mesh when an attacker attempts to bypass the active loop using a wire. As part of a boot-up sequence, the calibration engine runs a hysteresis sweep on the voltage comparator and stores a hysteresis sweep boot-up signature. When bypass protection is enabled, the bypass detector runs a hysteresis sweep of the voltage comparator periodically at a predetermined interval. Each sweep generates a generated signature that is compared to the stored boot-up signature. Any signature mismatch will be signaled as an impedance mismatch, or tamper. The hysteresis step size is also programmable. The calibration engine can make small changes to the boot-up signature to allow for small voltage variations.

18 Claims, 3 Drawing Sheets

(51) Int. Cl.
  *G06F 21/87*      (2013.01)
  *H03K 3/0233*     (2006.01)
  *H03K 3/84*       (2006.01)
  *H03K 19/003*     (2006.01)
  *H05K 1/02*       (2006.01)

(52) U.S. Cl.
  CPC .......... *H03K 3/02337* (2013.01); *H03K 3/84* (2013.01); *H03K 19/003* (2013.01); *H05K 1/0275* (2013.01)

(56) References Cited

U.S. PATENT DOCUMENTS

| | | | |
|---|---|---|---|
| 4,739,276 A | 4/1988 | Graube | |
| 5,970,074 A * | 10/1999 | Ehiro | G01R 31/30 714/745 |
| 8,170,814 B2 | 5/2012 | Wang et al. | |
| 8,803,535 B2 * | 8/2014 | Kothandaraman | H03F 3/45475 324/649 |
| 2004/0036446 A1 * | 2/2004 | Iwashima | G01R 31/3658 320/116 |
| 2007/0188187 A1 | 8/2007 | Oliva et al. | |
| 2007/0290712 A1 * | 12/2007 | Gomez | H03K 19/003 326/30 |
| 2011/0102064 A1 * | 5/2011 | Noorlag | H03K 19/00384 327/524 |
| 2012/0009826 A1 * | 1/2012 | Selwood | G06F 21/85 439/660 |
| 2015/0295619 A1 * | 10/2015 | Petrovic | H04L 25/4902 375/130 |
| 2015/0300858 A1 * | 10/2015 | Matsumoto | G01F 1/696 324/538 |
| 2016/0211843 A1 | 7/2016 | Wang | |
| 2017/0017943 A1 * | 1/2017 | Bilhan | G07F 19/2055 |
| 2017/0047837 A1 * | 2/2017 | Ermisch | H02M 1/32 |

OTHER PUBLICATIONS

Kulikarni, Vishnu B. et al, "Low-Voltage CMOS Comparators With Programmable Hysteresis", Found at URL:http://wordpress.nmsu.edu/pfurth/files/2015/06/Comparators_With_Hysteresis_Kulkarni_2005.pdf; 103 pages; Oct. 10, 2005.

* cited by examiner

| SCAN POSITION | HYSTERESIS CONTROL | HYSTERESIS (mV) | VOLTAGE COMPARATOR OUTPUT (MIN) | VOLTAGE COMPARATOR OUTPUT (WORST) | TAMPER OUTPUT |
|---|---|---|---|---|---|
| 0 | 000 | 0 | 1 | 1 | 1 |
| 1 | 001 | 1 | 1 | 1 | 0 |
| 2 | 010 | 2 | 1 | 1 | 0 |
| 3 | 011 | 3 | 1 | 1 | 0 |
| 4 | 100 | 4 | 1 | 1 | 0 |
| 5 | 101 | 5 | 0 | 1 | 0 |
| 6 | 110 | 6 | 0 | 0 | 0 |
| 7 | 111 | 7 | 0 | 0 | 0 |

FIG. 2

ACTIVE TAMPER DETECTION CIRCUIT WITH BYPASS DETECTION AND METHOD THEREFOR

BACKGROUND

Field

This disclosure relates generally to electronic circuits and more specifically to an active tamper detection circuit with bypass detection and method therefore.

Related Art

A tamper detection circuit is used to secure a device from unauthorized access by signaling an alert when continuity of a conductor is interrupted. A passive tamper detector may apply a voltage to a detection circuit and if the circuit is tampered with, a change in a current is detected. An active tamper detector may apply a signed detection signal to one end of a detector circuit and compare it with a signal received at the other end of the detection circuit. In one embodiment, the detection circuit may include a plurality of conductors in the form a grid or mesh to from an active tamper loop over the device to be protected.

It may be possible to bypass an active tamper protection circuit by connecting a wire (jumper) between the ends of an active tamper loop. Now an attacker can isolate and cut or remove the mesh, and manipulate any components that were covered by the mesh, thus defeating the active tamper protection.

Therefore, a need exists for a need for an active tamper detection circuit with bypass detection that solves the above problems.

BRIEF DESCRIPTION OF THE DRAWINGS

The present invention is illustrated by way of example and is not limited by the accompanying figures, in which like references indicate the same or similar elements between the various embodiments. Elements in the figures are illustrated for simplicity and clarity and have not necessarily been drawn to scale.

FIG. 2 illustrates a table of example values for the variable hysteresis control circuit of FIG. 1.

DETAILED DESCRIPTION

Figure 1:
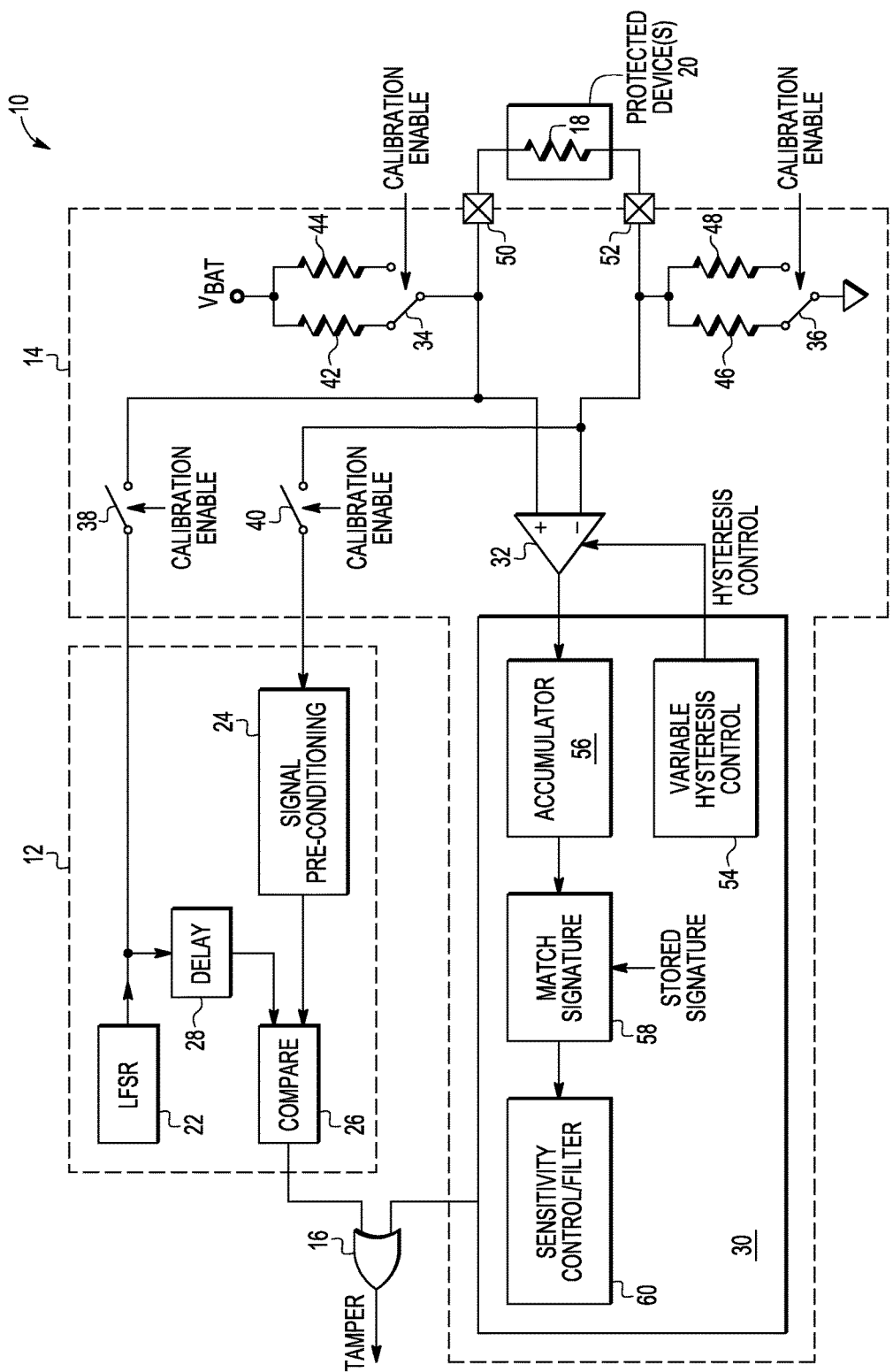
FIG. 1 illustrates, in partial block diagram form and partial schematic diagram form, an active tamper detection circuit with bypass detection in accordance with an embodiment.

Generally, there is provided, an active tamper detection circuit with bypass detection. The bypass detection includes an active loop that is coupled to terminals of a bypass detector. The active loop may be a plurality of conductors, or traces, formed in a mesh or grid over a protected device. The bypass detector includes a voltage comparator with a variable hysteresis control circuit and a calibration engine. The bypass detector detects a change in impedance in the mesh when an attacker attempts to bypass the active loop using a wire. As part of a boot-up sequence, the calibration engine runs a hysteresis sweep on the voltage comparator and store a hysteresis sweep boot-up signature. When protection is enabled, the bypass detector runs a hysteresis sweep of the voltage comparator periodically at a predetermined interval. Each sweep generates a generated signature that is compared to the stored boot-up signature. Any signature mismatch of any part of the sweep will be signaled as an impedance mismatch, or tamper. The hysteresis step size is also programmable. The calibration engine can make small changes to the boot-up signature to allow for small voltage variations. Also, the bypass detection runs on the device battery domain so that stored confidential information, such as a private key, can be erased if the main supply is removed. However, the stored signature is retained even when the power supply voltage is removed. An abrupt change in the generated signature between two back-to-back calibration sweeps can indicate a tamper event of the active mesh loop. Whereas a gradual change over time, such as for example, changes caused by process variations and temperature can be distinguished.

In one embodiment, there is provided, a tamper detection circuit, comprising: an active tamper detection circuit for being coupled to an active tamper loop formed over a device to be protected from tampering, during an active tamper detection mode, the active tamper detection circuit detecting when conductivity of the active tamper loop is broken; and a bypass detection circuit comprising: a voltage comparator having a first input terminal for being coupled to a first end of the active tamper loop, a second input terminal for being coupled to the second end of the active tamper loop, an output terminal, and a control terminal; and a variable hysteresis control circuit having an output terminal coupled to the control terminal of the voltage comparator, wherein during a calibration mode of the bypass detection circuit, the variable hysteresis control circuit for periodically sweeping an output voltage of the voltage comparator at a pre-selected step size, the periodic active tamper sweep is compared to a stored sweep signature, a mismatch between the stored sweep signature and the periodic active tamper sweep being indicative of a tamper. The bypass detection circuit may be powered by a battery. The tamper detection circuit may be implemented on an integrated circuit. The calibration mode sweep may be run once per second. The bypass detection circuit may further comprise: an accumulator having an input coupled to the output terminal of the voltage comparator, and an output terminal; and a match signature comparator having a first input terminal coupled to the output terminal of the accumulator, a second input terminal coupled to receive the stored sweep signature, and an output for providing a mismatch signal. The bypass detection circuit may further comprise: a first resistor having a first terminal coupled to a power supply voltage terminal, and a second terminal, the first resistor having a first resistance; and a second resistor having a first terminal coupled to the power supply voltage terminal, and a second terminal, the second resistor having a second resistance that is less than the first resistance; a selection circuit coupled to the second terminals of both the first and second resistors, and to the first input terminal of the voltage comparator, the selection circuit coupling the second resistor to the first input terminal of the voltage comparator during the calibration mode, and for coupling the first resistor to the first input terminal of the voltage comparator during the active tamper detection mode. The stored sweep signature may be determined during a boot-up sequence of the bypass detection circuit. The tamper detection circuit may further comprise a logic gate having a first input terminal coupled to an output terminal of the active tamper detection circuit, a second input terminal coupled to an output terminal of the bypass detection circuit, and an output terminal for providing a tamper signal.

In another embodiment, there is provided, a tamper detection circuit comprising: an active tamper detection circuit for being coupled to an active tamper loop formed over a device to be protected from tampering, during an active tamper detection mode the active tamper detection circuit detecting when conductivity of the active tamper loop is broken; and a bypass detection circuit comprising: a voltage comparator having a first input terminal for being coupled to a first end of the active tamper loop, a second input terminal for being coupled to the second end of the active tamper loop, an output terminal, and a control terminal; and a variable hysteresis control circuit having an output terminal coupled to the control terminal of the voltage comparator, wherein during a calibration mode of the bypass detection circuit, the variable hysteresis control circuit for periodically sweeping an output voltage of the voltage comparator at a pre-selected step size, the periodic active tamper sweep is compared to a stored sweep signature, a mismatch between the stored sweep signature and the periodic active tamper sweep being indicative of a tamper, wherein the active tamper detection mode running alternately with the calibration mode. The tamper detection circuit may be implemented on an integrated circuit. The bypass detection circuit may be powered by a battery. The stored sweep signature may be determined during a boot-up sequence of the bypass detection circuit. The bypass detection circuit may further comprise: a first resistor having a first terminal coupled to a power supply voltage terminal, and a second terminal, the first resistor having a first resistance; and a second resistor having a first terminal coupled to the power supply voltage terminal, and a second terminal, the second resistor having a second resistance that is less than the first resistance; a selection circuit coupled to the second terminals of both the first and second resistors, and to the first input terminal of the voltage comparator, the selection circuit coupling the second resistor to the first input terminal of the voltage comparator during the calibration mode, and for coupling the first resistor to the first input terminal of the voltage comparator during the active tamper detection mode. The bypass detection circuit may further comprise: an accumulator having an input coupled to the output terminal of the voltage comparator, and an output terminal; and a match signature comparator having a first input terminal coupled to the output terminal of the accumulator, a second input terminal coupled to receive the stored sweep signature, and an output for providing a mismatch signal. The tamper detection circuit may further comprise a logic gate having a first input terminal coupled to an output terminal of the active tamper detection circuit, a second input terminal coupled to an output terminal of the bypass detection circuit, and an output terminal for providing a tamper signal.

In yet another embodiment, there is provided, a method of detecting attempted bypassing of an active tamper loop, the method comprising: sweeping a comparator with a hysteresis voltage having a pre-selected step size to generate an output voltage sweep; comparing the output voltage sweep with a stored sweep signature; and detecting the attempted bypass if there is a mismatch between the output voltage sweep and the stored sweep signature. The stored sweep signature may be stored during a first sweep of the comparator with the hysteresis voltage. Sweeping the comparator with a hysteresis voltage may be performed periodically. The method may further comprise running active tamper detection alternately with the method for detecting attempted bypassing of the active tamper loop. Sweeping the comparator with the hysteresis voltage may further comprise providing a current through the active tamper loop during the sweeping.

FIG. 1 illustrates, in partial block diagram form and partial schematic diagram form, an active tamper detection circuit 10. Active tamper detection circuit 10 includes active tamper detector 12, bypass detector 14, OR logic gate 16, and active mesh 18. Tamper detector 12 includes linear feedback shift register (LFSR) 22, signal preconditioner 24, comparator 26, and delay 28. Bypass detector 14 includes calibration engine 30, voltage comparator 32, switches 34, 36, 38, and 40, and resistors 42, 44, 46, and 48. Calibration engine 30 includes variable hysteresis control 54, accumulator 56, match signature 58, and sensitivity control/filter 60. Active mesh 18 has a first terminal connected to a terminal 50 and a second terminal connected to a terminal 52. Active mesh 18 is illustrated as a resistor formed over a protected device 20. Protected device 20 may be an integrated circuit or a plurality of integrated circuits on a printed circuit board.

Active tamper detection circuit 10 may be implemented as a portion of an integrated circuit. In one embodiment, the integrated circuit may be a system-on-a-chip (SoC). In another embodiment, the integrated circuit may be a different type of integrated circuit. Terminals 50 and 52 are terminals of the integrated circuit having active tamper detection circuit 10. Terminal 50 and 52 are for allowing connection of both active tamper detector 12 and bypass detector 14 to the ends of active mesh 18. In tamper detector 12, LFSR 22 has an output terminal for providing a series of bits to terminal 50 via switch 38. In another embodiment, LFSR 22 may be replaced with a random number generator. Signal pre-conditioning block 24 has an input terminal coupled to terminal 52 switch 40, and an output terminal. Switches 38 and 40 are coupled to receive an enable signal labeled "CALIBRATION ENABLE" from control circuitry of calibration engine 30. Delay circuit 28 has an input coupled to the output of LFSR 22, and an output. Comparator 26 has a first input terminal coupled to output of delay 28, a second input terminal coupled to the output terminal of signal pre-conditioning block 24, and an output terminal.

In bypass detector 14, resistor 42 has a first terminal connected to a power supply voltage terminal labeled "VBAT", and a second terminal. Resistor 44 has a first terminal connected to power supply voltage terminal VBAT, and a second terminal. Switch 34 has a first terminal that is selectively coupled to either one of the second terminals of resistors 42 and 44 based on a logic state of enable signal CALIBRATION ENABLE, and a second terminal connected to terminal 50. Resistor 46 has a first terminal connected to terminal 52, and a second terminal. Resistor 48 has a first terminal connected to terminal 52, and a second terminal. Switch 36 has a first terminal that is selectively coupled to either one of the second terminals of resistors 46 and 48 based on the logic state of enable signal CALIBRATION ENABLE, and a second terminal connected to ground. Voltage comparator 32 has a first input terminal labeled plus (+) connected to terminal 50, a second input terminal labeled minus (−) connected to terminal 52, a control terminal coupled to receive a control signal labeled "HYSTERESIS CONTROL", and an output terminal. Calibration engine 30 has an input terminal connected to the output voltage comparator 32, and an output terminal. In calibration engine 30, variable hysteresis control block 54 has an output for providing HYSTERESIS CONTROL. Accumulator 56 has an input terminal connected to the output terminal of voltage comparator 32, and an output terminal. Match signature block 58 has a first input terminal connected to the output terminal of accumulator 56, a second input terminal for receiving a stored comparator hysteresis signature labeled "STORED SIGNATURE", and an output terminal. Sensitivity control/filter 60 has an input terminal connected to the output terminal of match signature 58. OR logic gate 16 has a first input terminal connected to the output terminal of comparator 26, a second input terminal connected to the output terminal of calibration engine 30, and an output terminal for providing a tamper detection signal labeled "TAMPER". In another embodiment, OR logic gate 16 may be a different logic gate or combination of logic gates.

Active mesh 18 is formed as a grid or mesh of a plurality of conductive wires or traces. The wires or traces are formed on a printed circuit board (PCB) over one or more integrated circuits and other components to be protected from tampering by an attacker. In FIG. 1, active mesh 18 is represented as a resistor over a protected device(s) 20. Also, in one embodiment, switches 42, 44, 46, and 48 are multiplexing type circuits, in another embodiment, switches 42, 44, 46, and 48 may be transmission gates. In addition, power supply voltage VBAT is provided by a battery and may be regulated to a predetermined voltage level. In another embodiment, the power supply voltage may be provided by a different source. Resistors 42 and 46 have a lower resistance value than resistors 44 and 48. For example, in one embodiment, resistors 42, and 46 are 100-ohm resistors and resistors 44 and 48 are 300-kilo ohm resistors.

In operation, active tamper detector 12 is coupled to active mesh 18 in response to calibration enable signal CALIBRATION ENABLE being in a first predetermined logic state, closing switches 38 and 40 and causing resistors 44 and 48 to be connected to terminals 50 and 52, respectively. LFSR 22 provides a plurality of bits to active mesh loop 18 via switch 38 in response to a clock signal (not shown). The bits return via terminal 52 and switch 40 to the input of signal pre-conditioning block 24. Signal pre-conditioning block 24 provides, for example, filtering and buffering to the bits and provides the filtered and buffered bits to the second input of comparator 26. Comparator 26 compares the returning bits to the bits leaving LFSR 22. If one or more of the bits do not match, active mesh loop 18 has been tampered with, and a signal indicating tampering is provided to OR logic gate 16. Delay circuit 28 provides a predetermined delay to the bits just leaving LFSR 22 to match a signal delay of returning bits from active mesh loop 18 and signal pre-conditioning block 24.

It may be possible for an attacker to defeat the tamper protection provided by active tamper detector 12 by connecting a wire jumper to terminals 50 and 52, thus providing an alternate conductive path for the bits provided by LFSR 22, thus bypassing active mesh loop 18. This allows an attacker to remove or cut active mesh loop 18, providing access to the protected device(s) 20 without triggering a tamper. To prevent an attacker from bypassing active tamper detector 12 in this manner, bypass detector 14 is enabled periodically to check the integrity of active mesh loop 18. The active mesh loop will have an impedance. A wire jumper used to bypass the active mesh loop will have a different impedance. Bypass detector 14 uses a voltage comparator with a predetermined output signature to detect the impedance difference between the active mesh loop and the wire, even if the impedance difference is relatively small.

The first time an integrated circuit device having bypass detector is booted up, a first calibration sequence is run on voltage comparator 32 and a calibration "signature" is stored. Then, each subsequent time the calibration mode sweep is run, the generated signature is compared to the stored signature, bit-by-bit. The stored signature is a precise indication of the voltage at which the voltage comparator output transitions from a logic high to a logic low, or from a logic low to a logic high, depending on which direction the sweep is run. Any mismatch between any of the bits and an impedance mismatch tamper signal is provided to the second input terminal of OR logic gate 16.

During the calibration mode, calibration engine 30 provides calibration enable signal CALIBRATION ENABLE to cause switches 38 and 40 to be open, or non-conductive. Switch 34 connects resistor 42 to terminal 50 and switch 36 connects resistor 46 to ground. The lower resistance resistors 42 and 44 cause a current to flow between VBAT and ground through active mesh loop 18. A voltage drop across active mesh loop 18 is sensed at the plus and minus input terminals of voltage comparator 32. Variable hysteresis control 54 provides a multi-bit control signal HYSTERESIS CONTROL that runs a voltage sweep on voltage comparator. The use of three bits allows the output voltage of voltage comparator 32 to provide eight output bits. A sample hysteresis sweep is illustrated in FIG. 2. An eight-bit sweep is shown for illustration purposes and may be different in actual implementation. In one embodiment, the sweep step size is 1 millivolt. The voltage sweep step size may be variable in some embodiments. The first time the calibration mode has been run, the output voltage values of comparator 32 are stored as stored signature STORED SIGNATURE. In one embodiment, the stored signature STORED SIGNATURE may be stored in a non-volatile memory such as a read-only memory (ROM), or in another type of one-time programmable (OTP) memory, such as electrically blown fuses or a write-once register during boot up. Then, when an active tamper detection mode is enabled, bypass detector 14 will run the voltage sweep on voltage comparator 32. The generated output bits are temporarily stored in accumulator 56 and are compared to the stored signature using match signature comparator 58. Any mismatch between any of the bits will cause match signature comparator 58 to output a mismatch signal to sensitivity control/filter 60. In one embodiment, the hysteresis calibration sweep is run on voltage comparator 32 every second. In another embodiment, the sweep interval may be different.

FIG. 2 illustrates a table of example values for a hysteresis sweep using the variable hysteresis control circuit 54 of FIG. 1. The first two columns show scan position and the hysteresis control signal. The hysteresis control signal has three bits, thus the hysteresis sweep has eight scan positions. In other embodiments, the number of control bits may be different, providing a different number of scan positions. A step size of one (1) millivolt (mV) is illustrated. Other step sizes can be used. Two columns show two possibilities for the voltage comparator 32 output that may be the stored signature STORED SIGNATURE, one is for best-case process and temperature variations (min) and the other is for worst-case process and temperature variations (max).

Figure 3:
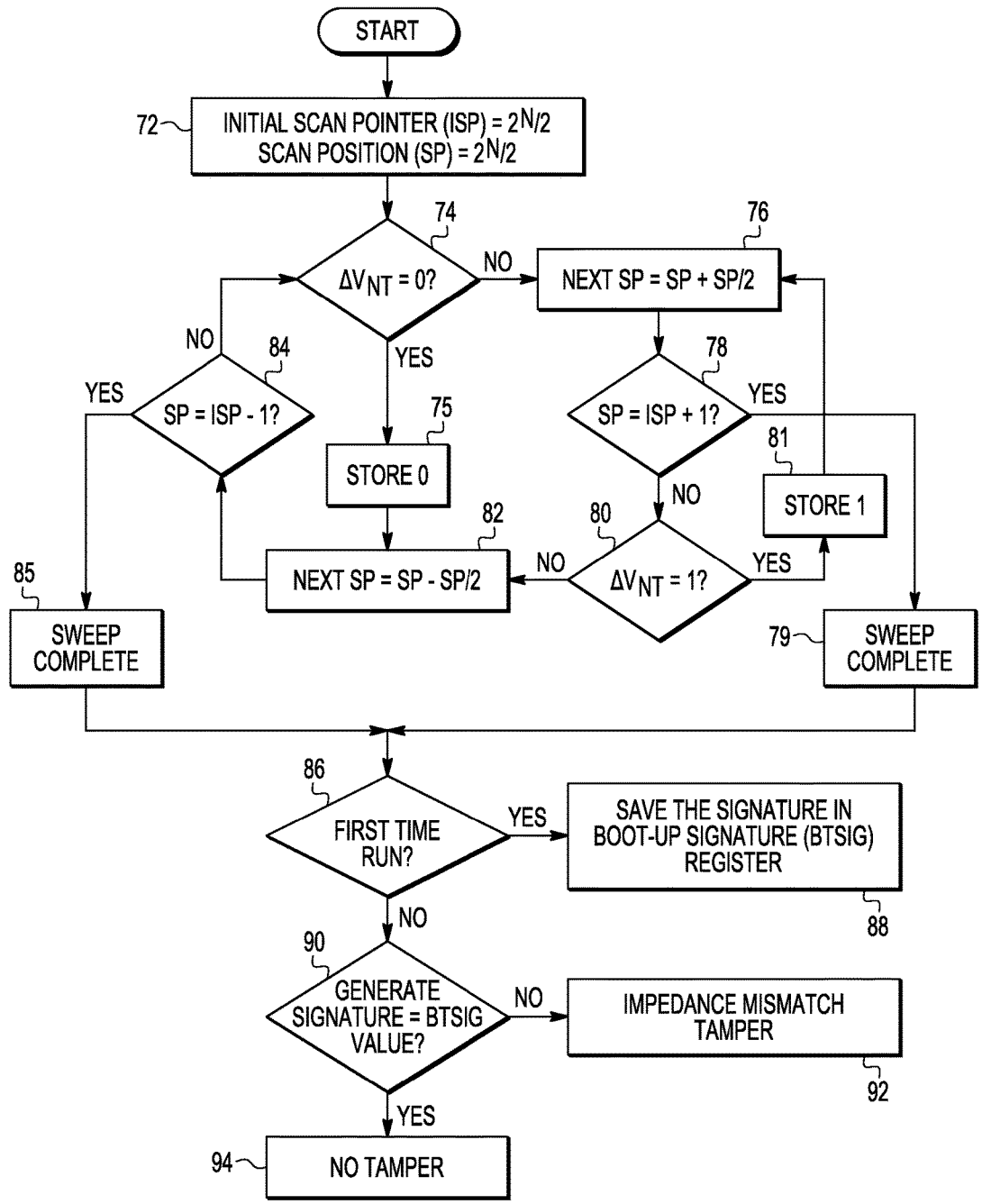
FIG. 3 illustrates a method for running the calibration mode of the bypass detection circuit of FIG. 1.

FIG. 3 illustrates method 70 for running the calibration mode of the bypass detection circuit of FIG. 1. Method 70 may be run by a state machine in calibration engine 30. In method 70, N is an integer equal to the number of hysteresis control bits. In the illustrated example, N equals 3. At step 72, an initial scan position (ISP) or a scan position (SP) is equal to $2^N/2$. If N=3, ISP=4. Therefore, the ISP of the sweep to generate a signature for comparator 32 begins at the fourth scan position shown in FIG. 2. Because the bypass detector 14 operates from a battery, an objective of the method is to find a initial scan position where the comparator output transitions between a logic one output and a logic zero output in the fewest number of iterations. Generally, linearly scanning the first positions where there is not likely to be an output change is a waste of battery power and time. Whether or not this is the first time calibration mode is run, the scan begins at ISP=4 or SP=4 for a sweep that has eight scan positions as can be seen in FIG. 2.

At decision step 74, it is determined if the "no tamper" change in voltage ($\Delta V_{NT}$) causes a zero to be output by comparator 32. If yes, then the YES path is taken to step 75 and a logic zero is stored for the current SP. At step 82, the next SP is made equal to SP−SP/2. If the current SP is equal to 6, then the next SP would be equal to 3. At decision step 84, it is determined if SP=ISP−1. For the present example where SP is now equal to 3, the YES path is taken to step 85 and the sweep is complete because the transition cross-over point has been found. However, if at decision step 84 the answer was no, then the NO path returns to decision step 74. At decision step 74, if a logic zero is not caused to be output from the comparator, then the NO path is taken to step 76. At step 76, the next SP=SP+SP/2. If the current SP is 4, then the next SP=6. At decision step 78, it is determined if SP=ISP+1. If yes, then the YES path is taken to step 79. At step 79, the sweep is complete and the method continues to step 86. However, if at decision step 78, the answer was no, then the NO path is taken to step 80. At decision step 80, it is determined if the no tamper voltage delta ($\Delta V_{NT}$) causes the comparator 32 output to equal one. If yes, then a logic one is stored for the current SP at step 81, and the method returns to decision step 76. If at decision step 80, it is determined that the "no tamper" voltage delta ($\Delta V_{NT}$) does not cause a one to be output, then the NO path is taken to step 82. At step 82, the next SP=SP−SP/2. At decision step 84, it is determined if SP=ISP−1. If no, the NO path is taken to decision step 74. If, at decision step 84, the answer is yes, then the YES path is taken to step 85 and the sweep is complete.

At decision step 86, if this is the first time calibration mode has been run, the stored values in accumulator 56 from steps 75 and 81 are stored in a boot-up signature register (BTSIG). If this is not first time calibration mode has been run, then the NO path is taken to decision step 90. At decision step 90, it is determined if the currently generated signature is equal to the stored signature in register BTSIG. If the answer is no, then the NO path is taken to step 92. At step 92, an impedance mismatch between the stored signature and the generated signature is detected, and a tamper signal TAMPER (FIG. 1) is asserted. If at decision step 90, the generated signature is equal to the stored signature, indicating that no tamper has been detected, then the YES path is taken to step 94, where a tamper signal is not generated.

Providing the ability to detect an impedance mismatch between a currently generated comparator output sweep signature and a stored sweep signature protects against an attacker bypassing an active mesh loop with a jumper.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A tamper detection circuit, comprising:
an active tamper detection circuit for being coupled to an active tamper loop formed over a device to be protected from tampering, during an active tamper detection mode, the active tamper detection circuit detecting when conductivity of the active tamper loop is broken; and
a bypass detection circuit comprising:
a voltage comparator having a first input terminal for being coupled to a first end of the active tamper loop, a second input terminal for being coupled to the second end of the active tamper loop, an output terminal, and a control terminal;
a variable hysteresis control circuit having an output terminal coupled to the control terminal of the voltage comparator, wherein during a calibration mode of the bypass detection circuit, the variable hysteresis control circuit for periodically sweeping an output voltage of the voltage comparator at a preselected step size, the periodic active tamper sweep is compared to a stored sweep signature, a mismatch between the stored sweep signature and the periodic active tamper sweep being indicative of a tamper; and
a first resistor having a first terminal coupled to a power supply voltage terminal, and a second terminal, the first resistor having a first resistance;
a second resistor having a first terminal coupled to the power supply voltage terminal, and a second terminal, the second resistor having a second resistance that is less than the first resistance; and
a selection circuit coupled to the second terminals of both the first and second resistors, and to the first input terminal of the voltage comparator, the selection circuit coupling the second resistor to the first input terminal of the voltage comparator during the calibration mode, and for coupling the first resistor to the first input terminal of the voltage comparator during the active tamper detection mode.

2. The tamper detection circuit of claim 1, wherein the bypass detection circuit is powered by a battery.

3. The tamper detection circuit of claim 1, wherein the tamper detection circuit is implemented on an integrated circuit.

4. The tamper detection circuit of claim 1, wherein the calibration mode sweep is run once per second.

5. The tamper detection circuit of claim 1, wherein the bypass detection circuit further comprises:
an accumulator having an input coupled to the output terminal of the voltage comparator, and an output terminal; and
a match signature comparator having a first input terminal coupled to the output terminal of the accumulator, a second input terminal coupled to receive the stored sweep signature, and an output for providing a mismatch signal.

6. The tamper detection circuit of claim 1, wherein the stored sweep signature is determined during a boot-up sequence of the bypass detection circuit.

7. The tamper detection circuit of claim 1, further comprising a logic gate having a first input terminal coupled to an output terminal of the active tamper detection circuit, a second input terminal coupled to an output terminal of the bypass detection circuit, and an output terminal for providing a tamper signal.

8. A tamper detection circuit comprising:
an active tamper detection circuit for being coupled to an active tamper loop formed over a device to be protected from tampering, during an active tamper detection mode the active tamper detection circuit detecting when conductivity of the active tamper loop is broken; and
a bypass detection circuit comprising:
a voltage comparator having a first input terminal for being coupled to a first end of the active tamper loop, a second input terminal for being coupled to the second end of the active tamper loop, an output terminal, and a control terminal;
a variable hysteresis control circuit having an output terminal coupled to the control terminal of the voltage comparator, wherein during a calibration mode of the bypass detection circuit, the variable hysteresis control circuit for periodically sweeping an output voltage of the voltage comparator at a pre-selected step size, the periodic active tamper sweep is compared to a stored sweep signature, a mismatch between the stored sweep signature and the periodic active tamper sweep being indicative of a tamper; and
a first resistor having a first terminal coupled to a power supply voltage terminal, and a second terminal, the first resistor having a first resistance; and
a second resistor having a first terminal coupled to the power supply voltage terminal, and a second terminal, the second resistor having a second resistance that is less than the first resistance; and
a selection circuit coupled to the second terminals of both the first and second resistors, and to the first input terminal of the voltage comparator, the selection circuit coupling the second resistor to the first input terminal of the voltage comparator during the calibration mode, and for coupling the first resistor to the first input terminal of the voltage comparator during the active tamper detection mode,
wherein the active tamper detection mode running alternately with the calibration mode.

9. The tamper detection circuit of claim 8, wherein the tamper detection circuit is implemented on an integrated circuit.

10. The tamper detection circuit of claim 8, wherein the bypass detection circuit is powered by a battery.

11. The tamper detection circuit of claim 8, wherein the stored sweep signature is determined during a boot-up sequence of the bypass detection circuit.

12. The tamper detection circuit of claim 8, wherein the bypass detection circuit further comprises:
an accumulator having an input coupled to the output terminal of the voltage comparator, and an output terminal; and
a match signature comparator having a first input terminal coupled to the output terminal of the accumulator, a second input terminal coupled to receive the stored sweep signature, and an output for providing a mismatch signal.

13. The tamper detection circuit of claim 8, further comprising a logic gate having a first input terminal coupled to an output terminal of the active tamper detection circuit, a second input terminal coupled to an output terminal of the bypass detection circuit, and an output terminal for providing a tamper signal.

14. A method of detecting attempted bypassing of an active tamper loop, the method comprising:
sweeping a control input of a comparator of a bypass detection circuit with an initial sequence having a pre-selected step size to generate an initial multi-bit signature indicating an initial voltage drop of the active tamper loop;
storing the initial multi-bit signature;
sweeping the comparator with a hysteresis voltage having a pre-selected step size to generate a current multi-bit output voltage sweep indicating a current voltage drop across the active tamper loop;
comparing the output voltage sweep with the stored sweep signature; and
detecting the attempted bypass if there is a mismatch between the current voltage drop of the output voltage sweep and the initial voltage drop indicated by the stored sweep signature, wherein the method protects against an attacker bypassing the active mesh loop with a jumper wire.

15. The method of claim 14, wherein the stored sweep signature is stored during a boot-up sequence of the bypass detection circuit.

16. The method of claim 14, wherein the sweeping the comparator with a hysteresis voltage is performed periodically.

17. The method of claim 14, further comprising running active tamper detection alternately with the method for detecting attempted bypassing of the active tamper loop.

18. The method of claim 14, wherein sweeping the comparator with the hysteresis voltage further comprises providing a current through the active tamper loop during the sweeping.

* * * * *